United States Patent
Khirman

(10) Patent No.: US 7,636,346 B2
(45) Date of Patent: Dec. 22, 2009

(54) METHOD AND SYSTEM FOR TRANSPORT PROTOCOL RECONSTRUCTION AND TIMER SYNCHRONIZATION FOR NON-INTRUSIVE CAPTURING AND ANALYSIS OF PACKETS ON A HIGH-SPEED DISTRIBUTED NETWORK

(75) Inventor: Stanislav Khirman, Sunnyvale, CA (US)

(73) Assignee: Narus, Inc., Sunnyvale, CA (US)

( * ) Notice: Subject to any disclaimer, the term of this patent is extended or adjusted under 35 U.S.C. 154(b) by 59 days.

(21) Appl. No.: 12/022,871

(22) Filed: Jan. 30, 2008

(65) Prior Publication Data
US 2008/0117915 A1    May 22, 2008

Related U.S. Application Data

(62) Division of application No. 10/427,182, filed on Apr. 29, 2003, now Pat. No. 7,349,400.

(51) Int. Cl.
*H04J 3/06* (2006.01)
(52) U.S. Cl. .................. 370/350; 510/394; 510/235; 510/230; 510/428
(58) Field of Classification Search .............. 370/394, 370/510, 350, 235, 230, 428
See application file for complete search history.

(56) References Cited

U.S. PATENT DOCUMENTS

| | | | | |
|---|---|---|---|---|
| 6,078,564 | A * | 6/2000 | Lakshman et al. | 370/235 |
| 6,118,765 | A * | 9/2000 | Phillips | 370/235 |
| 6,643,259 | B1 * | 11/2003 | Borella et al. | 370/231 |
| 6,791,945 | B1 * | 9/2004 | Levenson et al. | 370/235 |
| 6,975,647 | B2 * | 12/2005 | Neale et al. | 370/466 |
| 7,013,346 | B1 * | 3/2006 | Tucker | 709/236 |

(Continued)

FOREIGN PATENT DOCUMENTS

EP     0726664 A2     8/1996

(Continued)

OTHER PUBLICATIONS

Graham, Ian et al., "A Remote ATM Network Monitoring System" [online], Jul. 1998, [retrieved on Jul. 25, 2003]. Retrieved from the Internet: <URL: http://dag.cs.waikato.ac.nz/dag/papers/ATM-MonSyst.html>.

(Continued)

*Primary Examiner*—Jason E Mattis
*Assistant Examiner*—Kibrom T Hailu
(74) *Attorney, Agent, or Firm*—Fenwick & West LLP

(57) ABSTRACT

A transport protocol data flow reconstruction method delays determination that a missing packet is lost for a period of time. For an evaluated TCP packet in a first direction, the method determines if a TCP packet is missing in a second direction, in which case the method stores the evaluated TCP packet in a list and creates an acknowledgement timer indicating a maximum time to wait until treating the missing TCP packet as lost. Expiration of the acknowledgment timer indicates a missing packet in the second direction. The method determines if a TCP packet is missing in the first direction, in which case the method stores the evaluated TCP packet in the list and creates a retransmission timer indicating a maximum time to wait until treating the missing TCP packet as lost. Expiration of the retransmission timer indicates a missing packet in the first direction.

6 Claims, 15 Drawing Sheets

U.S. PATENT DOCUMENTS

| | | | |
|---|---|---|---|
| 7,058,085 B2* | 6/2006 | Earnshaw et al. | 370/473 |
| 2002/0054570 A1* | 5/2002 | Takeda | 370/252 |
| 2002/0167911 A1 | 11/2002 | Hickey | |
| 2003/0053461 A1* | 3/2003 | Ross | 370/394 |

FOREIGN PATENT DOCUMENTS

| | | |
|---|---|---|
| EP | 1280297 A2 | 1/2003 |
| EP | 1326388 A2 | 7/2003 |
| WO | WO 00/44138 | 7/2000 |

OTHER PUBLICATIONS

"DAG Standard Timestamps" [online], May 16, 2000, [retrieved on Jul. 25, 2003]. Retrieved from the Internet: <URL: http://dag.cs.waikato.ac.nz/dag/docs/dagduck v2.1.pdf>.

"UTCTIME" [online], Jan. 20, 2000, [retrieved on Jul. 25, 2003]. Retrieved from the Internet: <URL: http://dag.cs.waikato.ac.nz/dag/docs/utctime_v1.0.rev.pdf>.

"DAG Project: DAG2 Architecture" [online], Mar. 29, 2000, [retrieved on Jul. 29, 2003]. Retrieved from the Internet: <URL: http://dag.cs.waikato.ac.nzJdagldag2-arch.html>.

"DAG Project: DAG3 Architecture" [online], Jun. 8, 2000, [retrieved on Jul. 29, 2003]. Retrieved from the Internet: <URL: http://dag.cs.waikato.ac.nz/dag/dag3-arch.html>.

"Transmission Control Protocol, Darpa Internet Program, Protocol Specification" [online], Sep. 1981, [retrieved on Jul. 29, 2003]. Retrieved from the Internet: <URL: http://www.ietf.org/rIchfc0793.txt?number=793>.

Mills, David L., "Network Time Protocol (Version 3): Specification, Implementation and Analysis" [online], Mar. 1992, [retrieved on Jul. 29, 2003]. Retrieved from the Internet: <URL: http://www.ieff.org/rfc/rfc1305.txt?number=1305>.

"GPS Smart Antenna for Precise Timing and Synchronization" [online], 2003, Trimble Navigation Limited, [retrieved on Jul. 29, 2003]. Retrieved from the Internet: <URL: http://www.trimble.com/acutime2000.html>.

"Acutime 2000: GPS Smart Antenna for Precise Timing and Synchronization" [online], 2000-2001, Trimble Navigation Limited, [retrieved on Jul. 29, 2003]. Retrieved from the Internet: <URL: http://trl.trimble.com/dscgi/ds.py/Get/File-2597>.

* cited by examiner

METHOD AND SYSTEM FOR TRANSPORT PROTOCOL RECONSTRUCTION AND TIMER SYNCHRONIZATION FOR NON-INTRUSIVE CAPTURING AND ANALYSIS OF PACKETS ON A HIGH-SPEED DISTRIBUTED NETWORK

CROSS-REFERENCE TO RELATED APPLICATION

The present application is a divisional application under 35 U.S.C. §121 of, and claims priority under 35 U.S.C. §120 from, co-pending U.S. patent application Ser. No. 10/427,182 entitled "Method and System for Transport Protocol Reconstruction and Timer Synchronization for Non-Intrusive Capturing and Analysis of Packets on a High-Speed Distributed Network," filed on Apr. 29, 2003, which is incorporated by reference herein in its entirety.

TECHNICAL FIELD

The present invention relates generally to transport protocol reconstruction, and more specifically, to a method for Transmission Control Protocol (TCP) reconstruction and timer synchronization for non-intrusive capturing and analysis of packets on a high-speed distributed network.

BACKGROUND OF THE INVENTION

With the advent of the Internet, modern computer applications not only operate on isolated systems but also communicate with each other on data communication networks. These network applications communicate with each other by sending and receiving packets to and from each other on the networks. Network applications capture, process and analyze the packets on the network in order to communication with each other.

Figure ("FIG.") 1 is a diagram illustrating conventional communication between two network applications using the logical layers of a typical Transmission Control Protocol/Internet Protocol (TCP/IP) application. As shown in FIG. 1, two network applications, Peer A 102 and Peer B 104 communicate with each other using the layered TCP/IP protocol typically including 7 layers, some of which are omitted for clarity of explanation. Referring to FIG. 1, the layered TCP/IP protocol shown in FIG. 1 has an application layer (Layer 7) 106, 106' for applications such as Hypertext Transfer Protocol (HTTP) and email exchanging logical application transactions, a transport layer (Layer 4) 108, 108' for TCP or User Datagram Protocol (UDP) exchanging logical TCP streams, a network layer (Layer 3) 110, 110' for IP packets exchanging logical IP, and a data link layer (Layer 2) 112, 112' for the Ethernet, ATM, POS ("Packet-Over-Sonet"), etc. exchanging data packets. The final layer (not shown) of the TCP/IP protocol is the access method onto the actual wire transmitting the data. In general, the transport layer (Layer 4) may be implemented as a Transmission Control Protocol (TCP), Wireless Access Protocol (WAP), Stream Control Transmission Protocol (SCTP), or any other transport protocol that insures validity and integrity of the end-to-end data transmission.

When Peer A 102 initiates the communication to Peer B 104, the data to be transmitted is passed through 114 the TCP/IP layers 106, 108, 110, 112 until it is actually transmitted onto the wire 115. The data are packaged with a different header at each protocol layer. The receiving end Peer B 104 unpackages the received data, moving it back up to the stack 116 through the layers 112', 110' 108', 106' to the receiving application.

For successful analysis of the communication between the network applications 102, 104, a specialized non-intrusive packet collection system could be deployed. For successful analysis, such system should be able to capture, process, and analyze the packets received from other network applications in the correct order in which they were sent by the other applications. There are various commercial and open source applications performing packet analysis currently available for network applications. The success of these packet analysis applications depends upon their abilities to non-intrusively capture individual data transmission packets and restore the logical IP flows and TCP/UDP streams. Examples of packet analysis applications utilizing non-intrusive packet analysis include SNORT (The Open Source Network Intrusion Detection System), ETHEREAL (The Open Source Network Analyzer), the Carnivore System (FBI Internet Surveillance System), and the like. However, none of these conventional packet analysis applications are effective in TCP reconstruction for non-intrusive capturing and analysis of packets on a high speed distributed network, such as a full-duplex 100 Mbps network, Gigabit network, or POS network using separate physical channels for transmitting in opposite directions, especially when the packets are captured at different geographical locations of a distributed network.

FIG. 2 is a diagram illustrating an implementation of a conventional packet capturing and analysis system 200 commonly used for tapping a half-duplex Ethernet link. The packet capturing and analysis system 200 includes a Network Interface Card ("NIC") 210, a main memory (MM) 212, a Central Processing Unit ("CPU") 214, a storage module 216, and a timer 212. Peer A 202 and peer B 204 are network applications in computers communicating with each other on an Ethernet connection 206.

The packet capturing and analysis system 200 non-intrusively taps the Ethernet connection 206 between the two communication nodes, peer A 202 and peer B 204, by using devices such as a passive Ethernet hub, a passive Ethernet splitter, or a switch port mirroring device, to generate mirrored packets of the packet traveling on the Ethernet connection 206. The mirrored packets are captured using by the NIC 208. The captured packets are stored 209 in the NIC internal memory 210 and passed 211 in bulk to the MM 212 using Direct Memory Access (DMA) techniques. Once in a while (typically a few hundreds times in a second), the NIC 212 generates hardware interrupt 213 to inform the CPU 214 about the new set of packets ready for processing. Using the internal timer 218, the CPU 214 timestamps received packets and reconstructs Layer 3 (IP-to-IP), Layer 4 (TCP stream) and Layer 7 (Application) transactions using transaction reconstruction techniques well known to one skilled in the art. The results of the CPU-based analysis of the packets are stored in permanent storage 216 for future utilization. The functionalities of the NIC 208 and the sequential nature of the processes 209, 211, 213 of copying the packets ensure that the packets are presented to the CPU 214 in the same order in which the packets were presented to the Ethernet 206 by the communication peers 202, 204, regardless of the packet direction (from peer A to peer B or from peer B to peer A). This is very important for transaction reconstruction, because all conventional transaction reconstruction techniques operate based upon an assumption that the packet processing order correctly represents the inter-link behavior between peer A 202 and peer B 204.

In the reconstruction technique used by the system 200 of FIG. 2, the time stamping procedure is initiated by NIC interrupt 213 and performed by the CPU 214. Due to the relatively low interrupt rate (a few hundred times a second) and the relatively high packet arrival rate (up to 150,000 packets per second for a half-duplex 100 Mb Ethernet link), a large number (few thousands) of packets can be associated with one (non-precision) timestamp. This could be improved by using specialized NICs that employ an inter-NIC timer, however the "buffering" effect cannot be eliminated completely due to necessity of inter-NIC buffering and link delays. On the other hand, in case of the half-duplex Ethernet, the inaccuracy of the packet timestamping does not create a significant problem for transaction reconstruction because packets arrive to the CPU 214 at least in the same order as presented to the network 206 by applications 202 and 204.

FIG. 3 is a diagram illustrating a typical implementation of a conventional packet capturing and analysis system 300 for a full-duplex Ethernet link. The packet capturing and analysis system 300 includes a NIC card A 308, a NIC card B 310, a main memory (MM) 312, a Central Processing Unit (CPU) 314, a storage module 316, and a timer 318. Peer A 302 and peer B 304 are network applications in computers communicating with each other on a high-speed network using separate physical channels 305, 306 for transmitting packets in opposite directions. High-speed networks, such as a full-duplex 100 Mbps network, Gigabit network, or Packet-Over-Sonet (POS) network, typically use separate physical channels for transmitting in opposite directions.

The packet capturing and analysis system 300 non-intrusively taps the individual unidirectional links 305, 306 by using fiber-optic splitters (not shown) and provides the captured packets into the NICs 308, 310. The NICs 308, 310 are direction-specific, i.e., NIC 308 is only responsible for handling packets in the unidirectional link 305 for communication of packets from Peer A 302 to Peer B 304, and NIC 310 is only responsible for handling packets in the unidirectional link 306 for communication of packets from Peer B 304 to Peer A 302. The captured packets are stored in the MM 312, are time-stamped in response to hardware interrupts from the NICs 308, 310 and stored in the storage 316 for processing by the transaction reconstruction method.

With this configuration, packets from opposite directions could be presented into the MM 312 (and consequently to the transaction reconstruction method) in an order different from their original order in which they were presented to the links 305, 306, due to internal buffering and non-equal delays. Packet time-stamping provided by the timer 318 is not helpful as a criteria for packet reordering, because the timer 318 does not capture the original time of the transmission of the packet onto the links 305, 306, but captures the timing of the NIC (308, 310)-to-MM (312) transmission of the packets. The difference between these timings is small, typically in the range of 10-20 ms, but high-speed networks can transmit tens or hundreds of thousands of packets during this small interval. Some improvement can be achieved by synchronizing the NIC A 308 and the NIC B 310, however it requires expensive, specialized hardware. Moreover, this approach still does not eliminate the packet-reordering problem altogether.

FIG. 4 is a diagram illustrating an implementation of a conventional central packet analysis system 400 that operates in cooperation with two additional local packet capturing devices 402, 404 for a full-duplex Ethernet link in which the packets are captured at different locations. In a highly distributed network, it is sometimes impossible to tap opposite transmission links at a single geographical location. In such case, a distributed packet analysis configuration such as that shown in FIG. 4 is used. In such distributed configuration, packet capturing is carried out by packet capturing devices deployed as close as possible to the tapping point, such as the local packet capturing devices 402, 404, and the packet information from two or more capturing devices is delivered to the centralized packet analysis system 400.

Peer A 406 and peer B 408 are network applications in computers communicating with each other on a high-speed network using separate physical channels 410, 412 for transmitting packets in opposite directions. The central packet analysis system 400 includes a NIC card 414, a main memory (MM) 418, a CPU 422, a storage module 424, and a timer 420. The local packet capturing device 402 includes a NIC 426, a MM 430, a timer 432, and a CPU 434, and captures packets transmitted on the channel 410 from Peer A 406 to Peer B 408. The local packet capturing device 404 includes a NIC 436, a MM 440, a timer 442, and a CPU 444, and captures packets transmitted on the channel 412 from Peer B 408 to Peer A 406.

The local packet capturing device 402 captures packets transmitted on the channel 410 using NIC 426 and stores them temporarily in the internal memory 428. The packets are then stored in the MM 430 and time-stamped by the timer 432 in response to a hardware interrupt from the NIC 426 to the CPU 434. The local packet capturing device 404 captures the packets transmitted on the channel 412 using NIC 426, at a location distant from the location at which the local packet capturing device 402 captures packets, and stores them temporarily in the internal memory 438. The packets are stored in the MM 440 and time-stamped by the timer 442 in response to a hardware interrupt from the NIC 436 to the CPU 444. The packets are then transmitted from the local packet capturing devices 402, 404 to the central packet analysis system 400. The NIC 416 receives the packets from the local packet capturing devices 402, 404 and stores them in the internal memory 416. The packets are transferred to the MM 418, processed by 420, and the resulting reports are moved to the storage 424 for future processing.

Similarly to the packet capturing system 300 of FIG. 3, the centralized packet analysis system 400 often has packet-reordering problems caused by transmission delays in packet transmission, jitters, or non-perfect synchronizations of the local packet capturing devices' timers 432, 442. Further, in a distributed configuration such as that shown in FIG. 4, the packet re-ordering problem becomes more serious than that of the packet capturing system 300 in FIG. 3. This is because the timer inconsistence is in the order of 10-20 microseconds in a high-speed full-duplex network, which can lead to a time-stamping discrepancy at the central packet analysis system 400 in the order of a few seconds in the distributed capturing configuration. Considering that modern high-speed optical links can carry millions of packets per second, the out-of-order packet capturing problem becomes a major roadblock for packet analysis in distributed networks.

Timer mis-synchronization can be improved by using well-known synchronization techniques, such as a Network Time Protocol (NTP) synchronizing timers with under-second precision, and an External GPS clock capable of achieving 50 nanoseconds precision. However these techniques are associated with substantial additional cost and specialized equipment, and still cannot completely eliminate the timer mis-synchronization problem. Furthermore, the GPS synchronization technique requires installation of an external GPS antenna. Such requirements make these techniques unacceptable for many deployments and network configurations. In addition, unpredictable delays associated with buffering and interrupt latency cause time-stamping mistakes, even when precisions GPS timers are utilized.

An explanation of the practical problems associated with incorrect packet ordering will be provided below with reference to FIGS. 5 and 6.

FIG. 5 is an interaction diagram illustrating the typical packet sequence for an HTTP application communicating packets between a client 502 and a server 504. In FIG. 5, packets with labels starting with "A" are transmitted from the client 502 to the server 504 and packets with labels starting with "B" are transmitted from the server 504 to the client 502.

Referring to FIG. 5, in a typical HTTP application operating under the TCP/IP standard, the client sends a synchronization (SYN) packet (A1) to the server 504. The server 504 sends a synchronization-acknowledgment (SYN-ACK) packet (B1) back to the client 502. The client 502 sends an acknowledgement (ACK) packet (A2) and further sends a GET request (A3) to the server 504. In response, the server 504 sends responses (B2, B3, B4) to the GET request (A3) and a Finish (FIN) packet (B5) to the client 502. The client 502 sends Finish-Acknowledgement (FIN-ACK) (A4) to the server 504 and the server acknowledges receipt by sending ACK (B6) to the client 502.

FIG. 6 is an interaction diagram illustrating the packet sequence as seen by a CPU (not shown) and a transaction analysis application (not shown), when all the "client" side-originated 502 packets arrive at the CPU (not shown) after all the "server" side-originated 504 packets arrive. Since the client side 502 packets are time-stamped with a time later than the server side 504 packets, it causes a packet reordering problem. All the packets transmitted between the client 502 and the server 504 are identical to those described in FIG. 5, except that the order in which they are seen by the CPU (not shown) is different in that all the server side 504 packets (B1, B2, B3, B4, B5 packets) appear prior to the client side 502 packets (A1, A2, A3, A4 packets). Under such conditions, the CPU (not shown) has no information to enable itself to decide whether the packet sequence represents a single HTTP transaction or is a result of two half-captured transactions.

Starting sequential processing of the packets from packet B1 and so on, the CPU will incorrectly decide that the client side (A packets) communication was not captured due to capturing errors, even though in fact the A packets have been captured with at a later time with a later timestamp. This is because conventional transaction reconstruction methods consider packets in the order in which they are time-stamped and assume that missing packets in the time-stamped sequence of packets were lost during the packet capturing process. In other words, conventional transaction reconstruction methods are not capable of deferring the decision that a packet was lost. As such, conventional transaction reconstruction methods typically apply a "packet skip" procedure to handle the missing packets. As a result, the sequence of server-side packets (B1 through B6) will be analyzed as a partial HTTP response transaction and the client side packets (A1 through A4) will be analyzed as another independent client request, even though all the packets were in fact captured. When the client 502 and the server 504 communicate on a super-high speed and distributed optical network (such as an Internet backbone), these types of out-of-order and time synchronization problems become a significant factor in the correctness of the functionality and usefulness of the packet capturing and analysis system.

Therefore, in view of the above and many other shortcomings of the prior art, there is a need for a packet capturing and analysis system that can solve the out-of-order packet and time synchronization problems in a super-high speed distributed network environment. There is also a need for a packet capturing and analysis system that is capable of deferring the decision that a packet was lost until the system can be reasonably certain that the packet was indeed lost.

SUMMARY OF INVENTION

The present invention provides a method for reconstructing transport protocol data flow from a sequence of captured data packets in a more efficient manner by delaying a determination that a missing packet was lost for a certain period of time measured by a timer(s). The data packets may be TCP, WAP, SCTP, or other packets. The data packets are transmitted from a first device to a second device in a first direction on a first channel and from the second device to the first device in a second direction on a second channel. A first part of the data packets are captured by a first packet capturing device on the first channel and time stamped by a first timer, and a second part of the data packets are captured by a second packet capturing device on the second channel and time stamped by a second timer.

In one embodiment of the present invention, the method selects a data packet for evaluation captured by the first packet capturing device in the first direction and determines whether there is a missing data packet in the second direction. Responsive to determining that there is a missing data packet in the second direction, the method stores the data packet for evaluation in a first list, and creates an acknowledgement timer associated with the data packet stored in the first list. The acknowledgment timer indicates a maximum time to wait until treating the missing data packet as lost. When the acknowledgment timer expires, the method determines that at least one packet is missing in the second direction.

In another embodiment of the present invention, the method further determines whether there is a missing data packet in the first direction. Responsive to determining that there is a missing data packet in the first direction, the method stores the data packet for evaluation in a first list, and creates a retransmission timer associated with the data packet stored in the first list. The retransmission timer indicates a maximum time to wait until treating the missing data packet as lost. When the retransmission timer expires, the method determines that at least a packet is missing in the first direction.

The method for reconstructing data flow according to the present invention operates in real time as the data packets are captured. As a result, the method provides a real-time response and minimized amount of memory required for data packet reconstruction.

The present invention also provides a system for reconstructing data flow in a more efficient manner by delaying a determination that a missing packet was lost for a certain period of time measured by a timer(s). The data packets are transmitted from a first device to a second device in a first direction on a first channel and from the second device to the first device in a second direction on a second channel. A first part of the data packets are captured by a first packet capturing device on the first channel and time stamped by a first timer and a second part of the data packets are captured by a second packet capturing device on the second channel and time stamped by a second timer In one embodiment of the present invention, the system comprises a network interface module coupled to the first and second packet capturing devices for receiving the captured data packets, a data packet reordering module coupled to the network interface module and reordering the captured data packets according to their timestamps imposed by the first and second timers, and an acknowledgment timer coupled to the data packet reordering module and indicating the maximum time that the data packet reordering module will wait for a missing packet in the second direction in the captured data packets until the data packet reordering module identifies the missing packet as lost.

In another embodiment of the present invention, the system comprises a network interface module coupled to the first and second packet capturing devices for receiving the captured data packets, a data packet reordering module coupled to the network interface module and reordering the captured data packets according to their timestamps imposed by the first and second timers, and a retransmission timer coupled to the data packet reordering module and indicating the maximum time that the data packet reordering module will wait for a missing packet in the first direction in the captured data packets until the data packet reordering module identifies the missing packet as lost.

The data packet reordering method and system of the present invention delays a determination that missing packets in a data packet stream are lost, by deferring such determination until the acknowledgement timers and the retransmission timers expire at which point such a determination can be more reliably made. As such, the method and system of the present invention has less likelihood of determining that missing packets are lost even though they were in fact received at a later time, if they are received prior to expiration of the acknowledgement and retransmission timers. Thus, the data packet reordering method and system will encounter fewer instances of lost packets, resulting in higher efficiency in reconstructing data packets communicated between network applications.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

Figure 1:
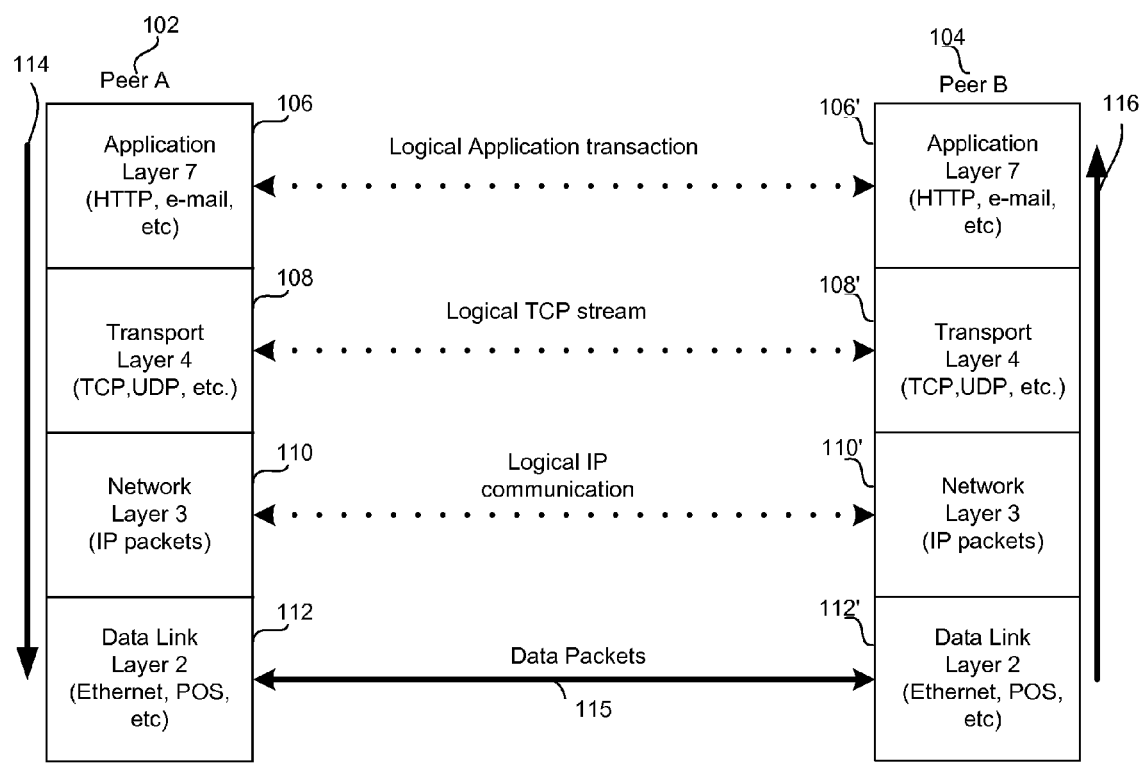
FIG. 1 is a diagram illustrating the communication between two network applications using the logical layers of a typical TCP/IP application.
Figure 2:
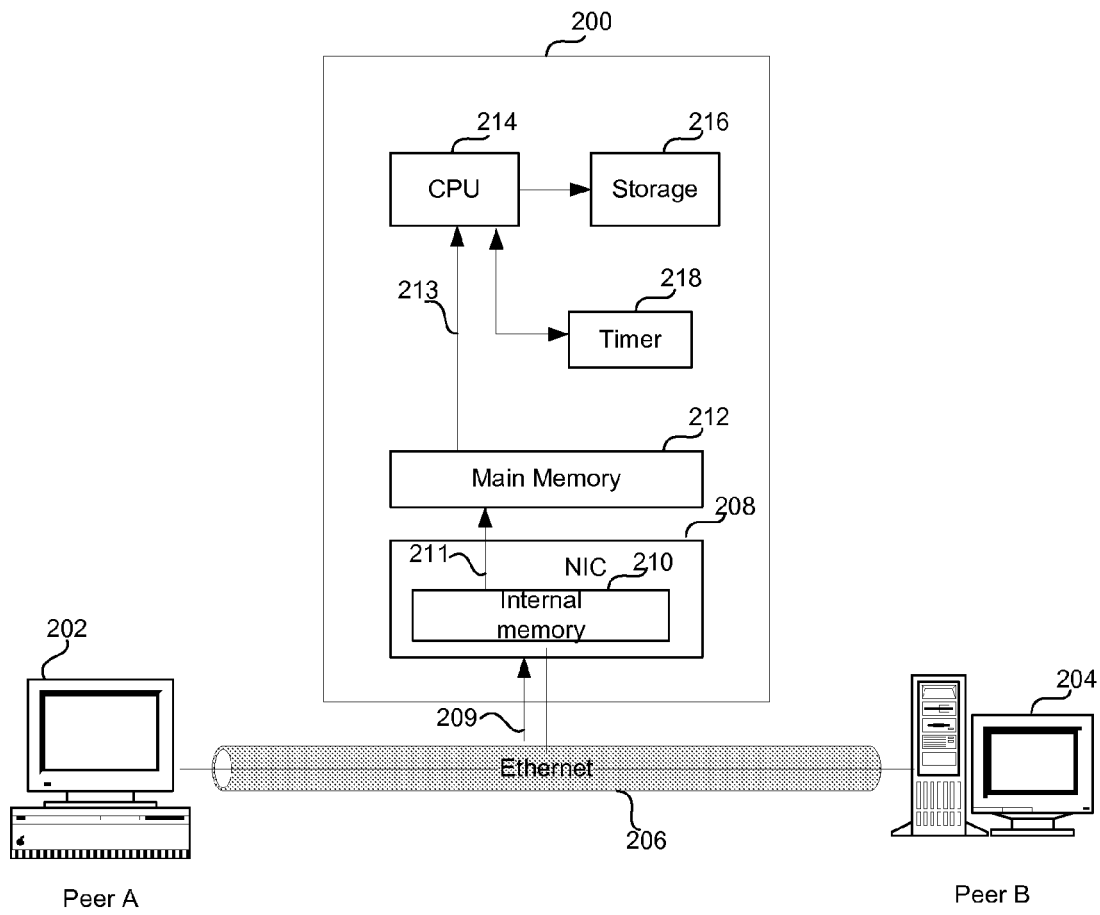
FIG. 2 is a diagram illustrating an implementation of a conventional packet capturing and analysis system commonly used for tapping a half-duplex Ethernet link.
Figure 3:
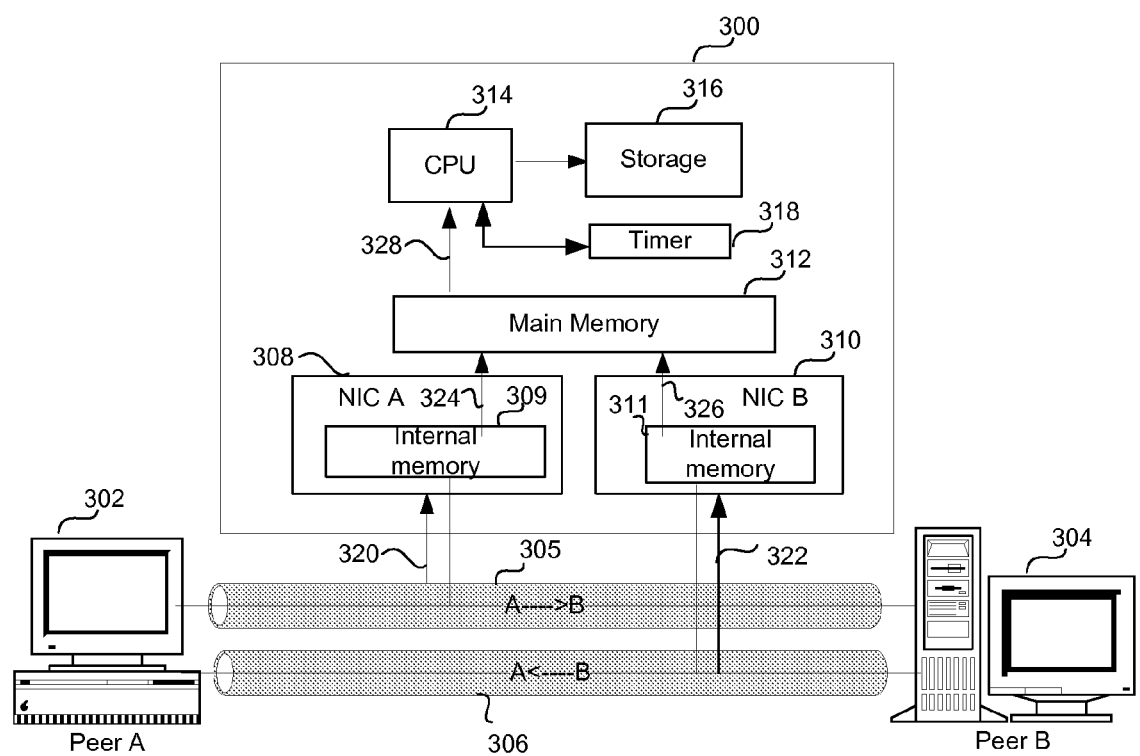
FIG. 3 is a diagram illustrating an implementation of a conventional packet capturing and analysis system for a full-duplex Ethernet link.

The embodiments of the present invention will be described below with reference to the accompanying drawings. Where possible, like reference numerals are used for like elements in the accompanying drawings. For convenience of explanation, the following description is directed to TCP (Transport Control Protocol) as a specific implementation of the general reliable transport protocol (layer 4 protocol). However, one skilled in the art would recognize that the present invention is compatible other reliable transport protocol implementations, such as a WAP (Wireless Access Protocol), SCTP (Stream Control Transmission Protocol), and the like.

Figure 4:
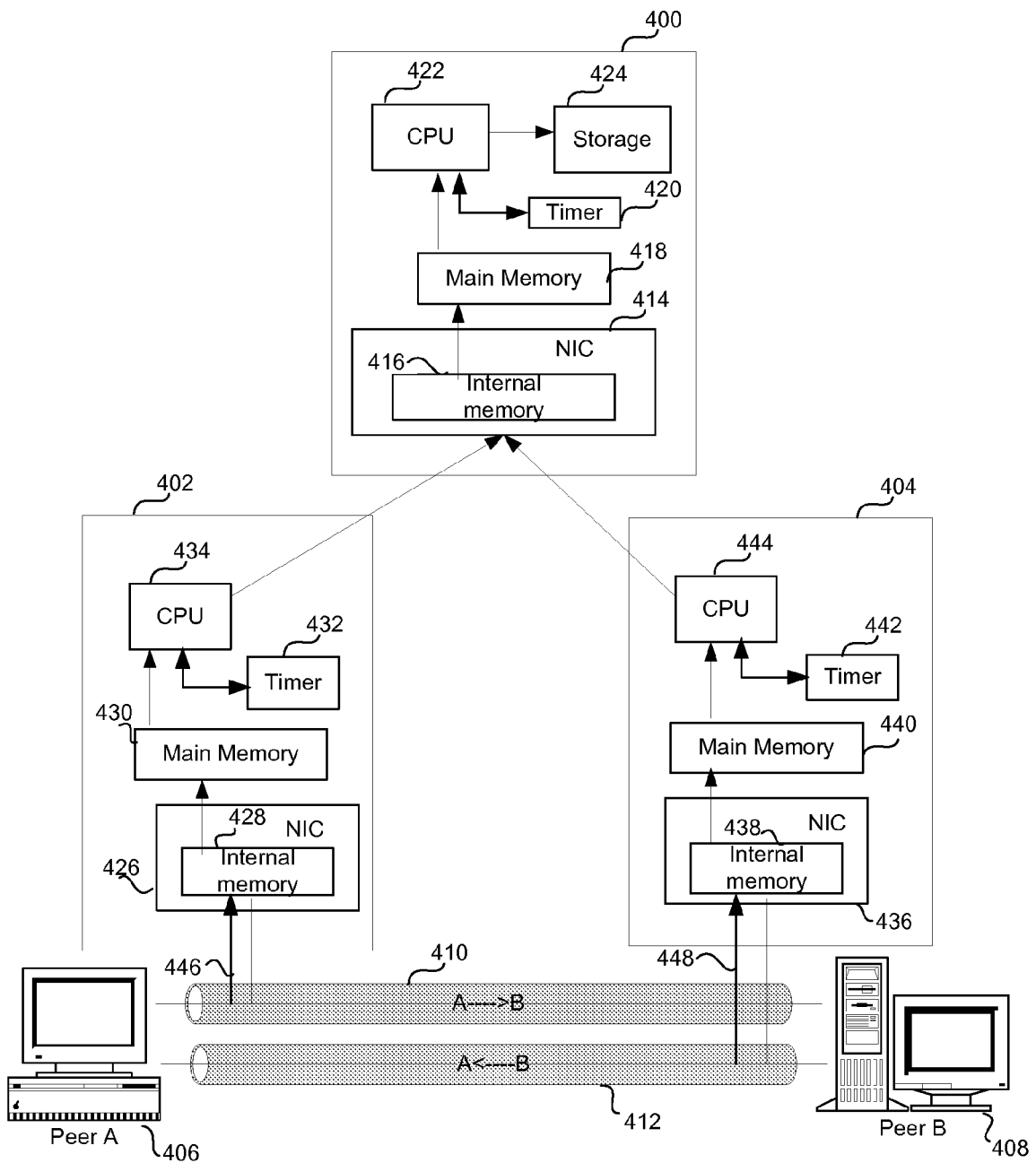
FIG. 4 is a diagram illustrating an implementation of a conventional central packet analysis system that operates in cooperation with two additional local packet capturing devices for a full-duplex Ethernet link in which the packets are captured at different locations.
Figure 5:
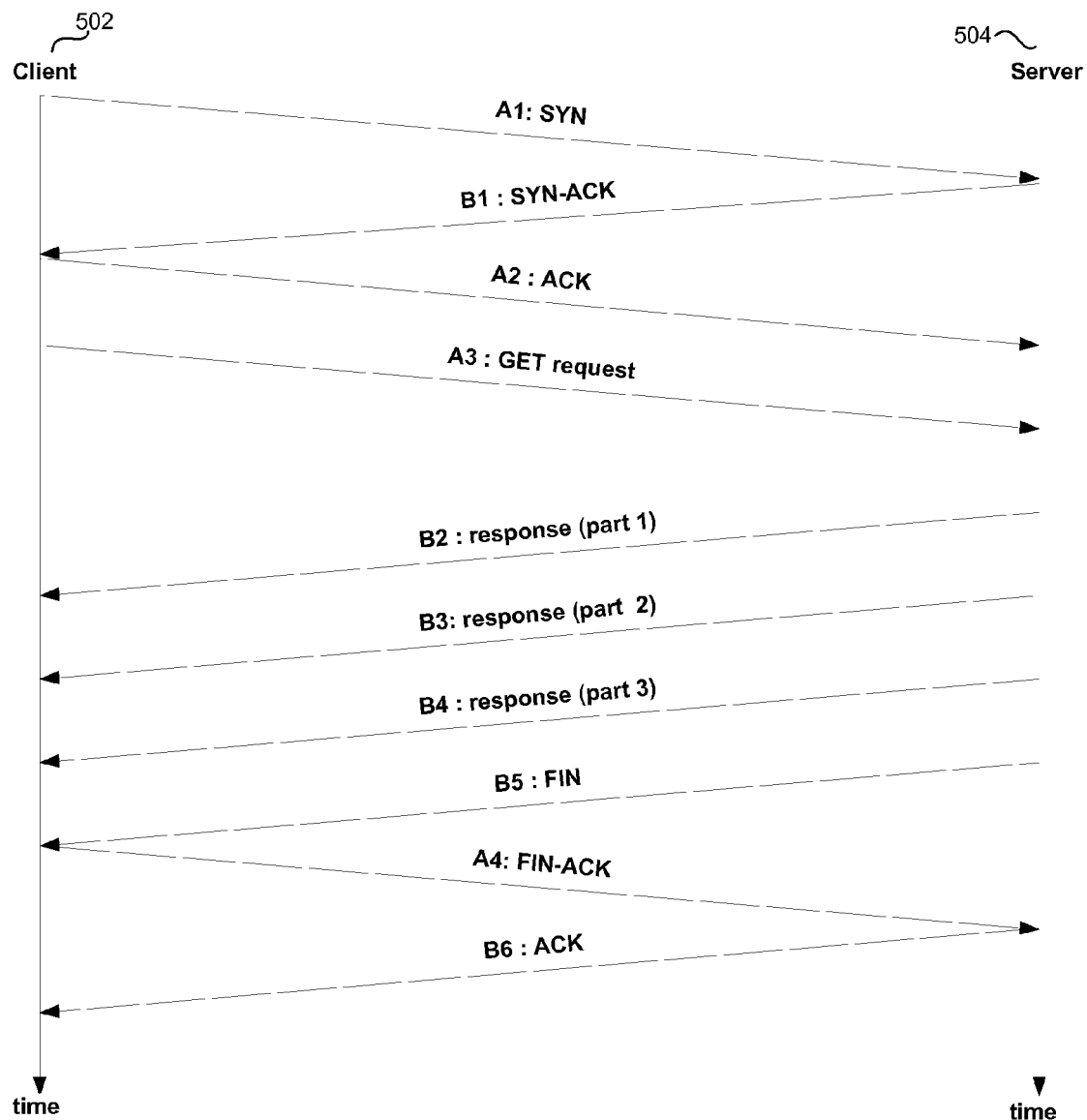
FIG. 5 is an interaction diagram illustrating the typical packet sequence for an HTTP application communicating packets between a client and a server.
Figure 6:
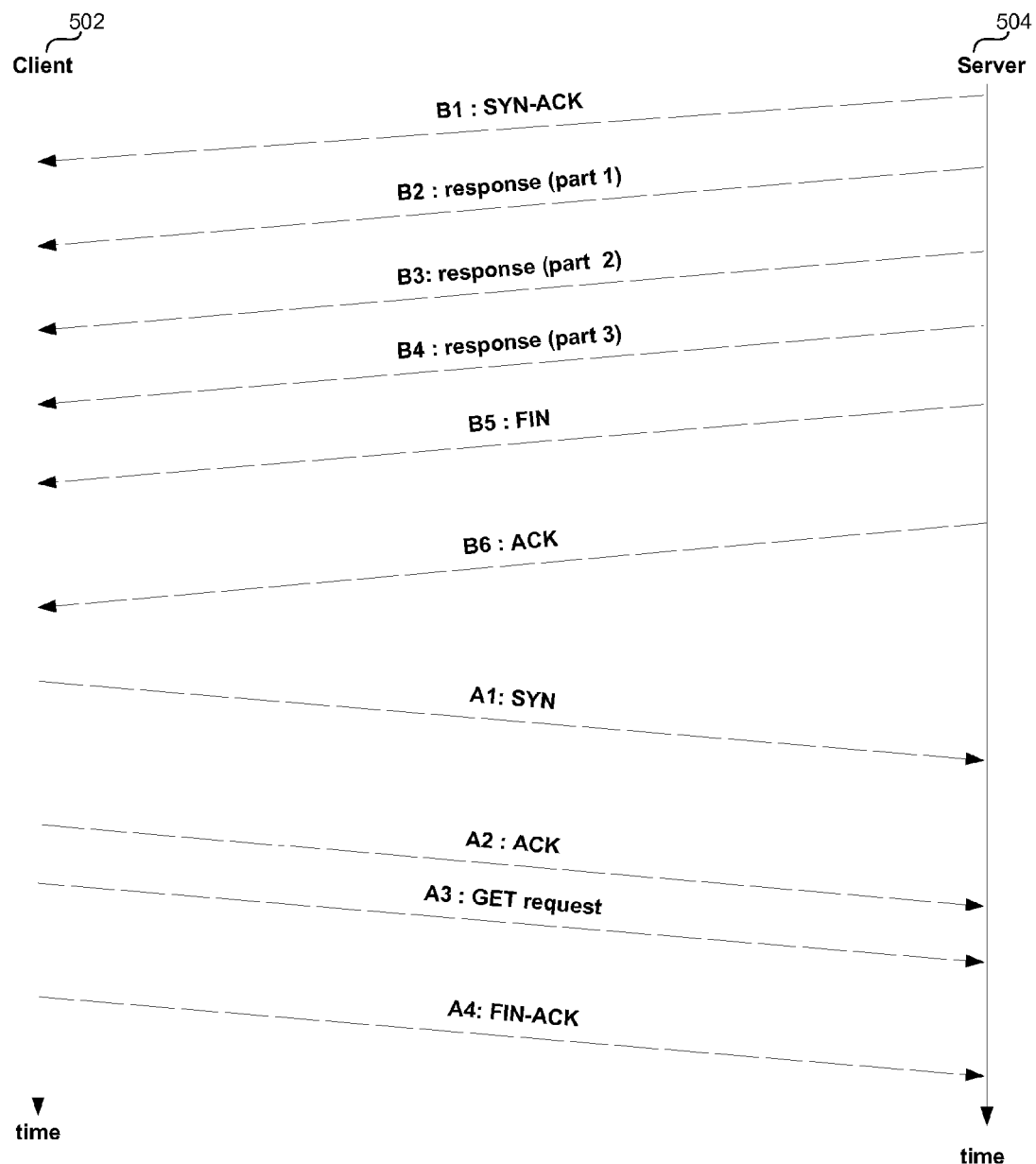
FIG. 6 is an interaction diagram illustrating the packet sequence as seen by a CPU and a transaction analysis application, when all the client side packets arrive at the CPU after all the server side packets arrive.
Figure 7A:
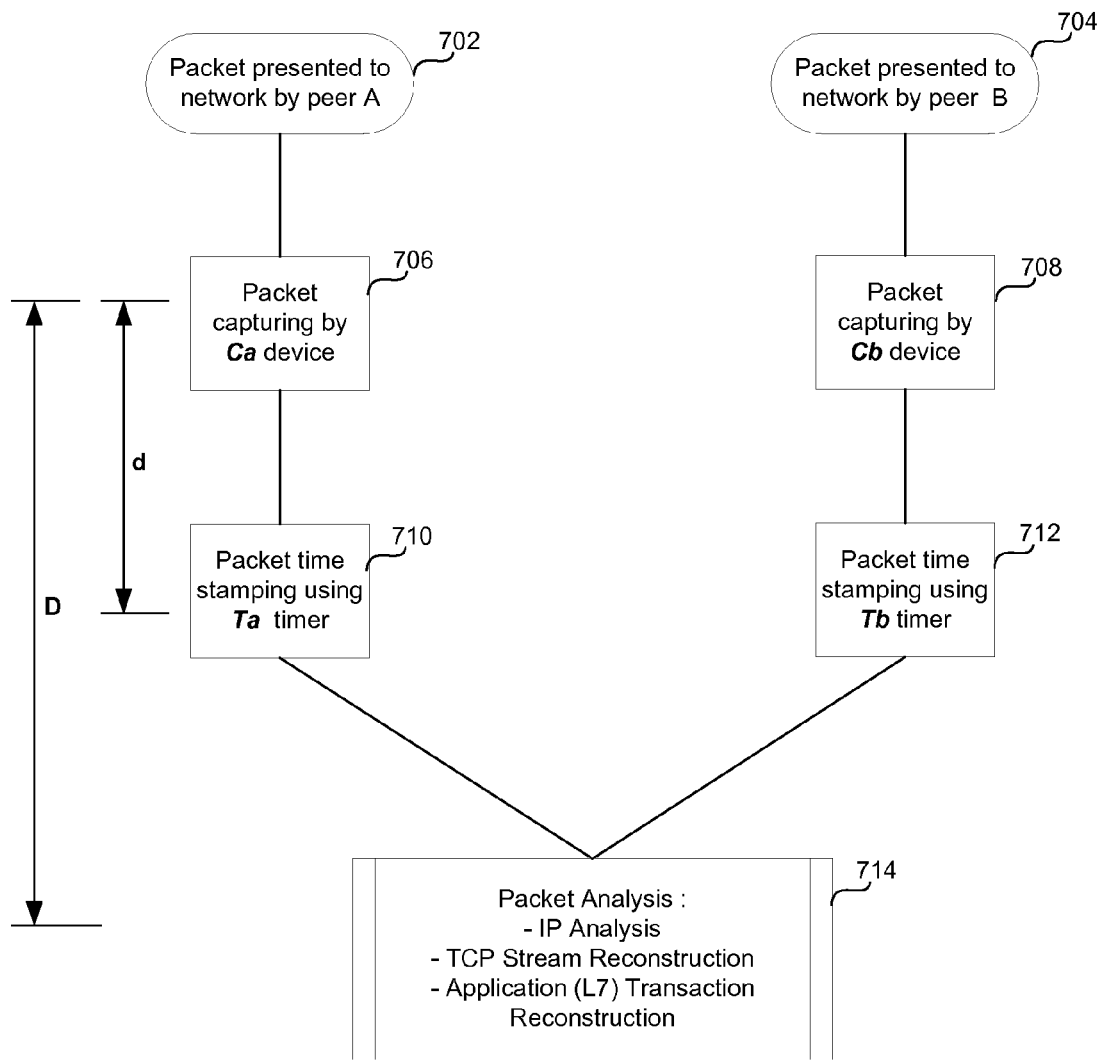
FIG. 7A is a functional block diagram illustrating the packet capturing and analysis system according to one embodiment of the present invention.

FIG. 7A is a functional flow diagram illustrating the packet capturing and analysis system according to one embodiment of the present invention. For the purpose of explaining the operation of the packet capturing and analysis system of the present invention, it is assumed that two Internet Protocol (IP) peers A and B (not shown) are connected by at least one full-duplex link, similar to the two peers 406, 408 connected by a full-duplex link 410, 412 shown in FIG. 4. It is also assumed that there are two capturing devices Ca and Cb (not shown) capable of collecting packets in the peer A to peer B direction and the peer B to peer A direction, respectively, similar to the two local packet capturing devices 402, 404 shown in FIG. 4. The capturing devices Ca and Cb have independent packet stamping timers Ta and Tb (not shown), similar to the timers 432, 442 shown in FIG. 4, with a maximum discrepancy of dT. The maximum discrepancy dT is a predetermined value known to the packet capturing and analysis system.

Timers Ta and Tb are not well synchronized to each other but the time drift effect is typically negligible. As a result, it is safely assumed that there is a value ddT that represents the actual time difference between the timers Ta and Tb. This actual time difference ddT is a value not known to the packet capturing and analysis system. By definition of dT, it is true that $|ddT|<dT$. For convenience of explanation, the timer Ta is considered to be the master herein. This means that if a global event on the network happens at time Ta, then the Cb timer time Tb (=Ta+ddT) will have value in the range of [Ta−dT, Ta+dT].

Referring to FIG. 7A, packets are presented 702 to the network by the peer A in the direction of peer A to peer B ("A direction") and packets are also presented 704 to the network in the direction of peer B to peer A ("B direction"). The capturing device Ca captures 706 the packets presented to the network by peer A in the A direction and the capturing device Cb captures 708 packets presented to the network by peer B in the B direction. The capturing devices Ca and Cb ensure non-intrusive best-effort sequential capturing of the packets. In one embodiment, best-effort capturing means that the capturing devices Ca and Cb are able to collect almost all packets presented to the network link, with only a very small percentage (usually 0.001%) of the packets being lost due to high load. The capturing devices Ca and Cb collect packets in the same order as they pass the capturing points of the network. The packets captured by the capturing device Ca are time-stamped 710 using the internal timer Ta, and the packets captured by the capturing device Cb are time-stamped 712 using the internal timer Tb.

The maximum delay between the capturing 706, 708 and the time-stamping 710, 712 is a known value of d. The sequence of the A direction packets {a1, a2, a3, . . . } are time-stamped with times {Ta1, Ta2, Ta3 . . . } and the sequence of the B direction packets {b1, b2, b3, . . . } are time-stamped with times {Tb1, Tb2, Tb3 . . . }. Due to the nature of packet capturing, if packet a2 was presented to the network after packet a1, then packet a2 will be captured after a1 and packet a2 will be time-stamped after a1, i.e., Ta2>=Ta1. That is, packets presented to the network in the A direction later than a packet presented to the network in the same A direction are always captured later. But packets presented to the network in the B direction later than a packet presented to the network in the A direction are not always captured and/or time-stamped later. The capturing devices Ca, Cb are connected to the centralized packet analysis device 714. The collected packets are delivered to the centralized packet analysis device 714 in batch. The centralized packet analysis device 714 performs packet analysis, IP analysis, TCP (or other transport protocol) stream reconstruction, and application transaction reconstruction. The maximum allowed delay between packet capturing 706, 708 and delivery to the central packet analysis system 714 is a predetermined value D.

It is assumed herein that sequences {a1, a2, a3, . . . } and {b1, b2, b3, . . . } represent packets from a single TCP stream. Consistent with the TCP/IP protocol known to those skilled in the art, each TCP packet carries a TCP sequential number (Seq). The sequential number is advanced by the amount of data transmitted (Len) by the packets. Some of the packets carry an acknowledgement number (Ack) that is equal to the Seq number of the last successfully received continuous data. The validity of sequence acknowledgement is defined by presence of the special ACK flag. In general, a majority of TCP packets have the ACK flag set.

Figure 7B:
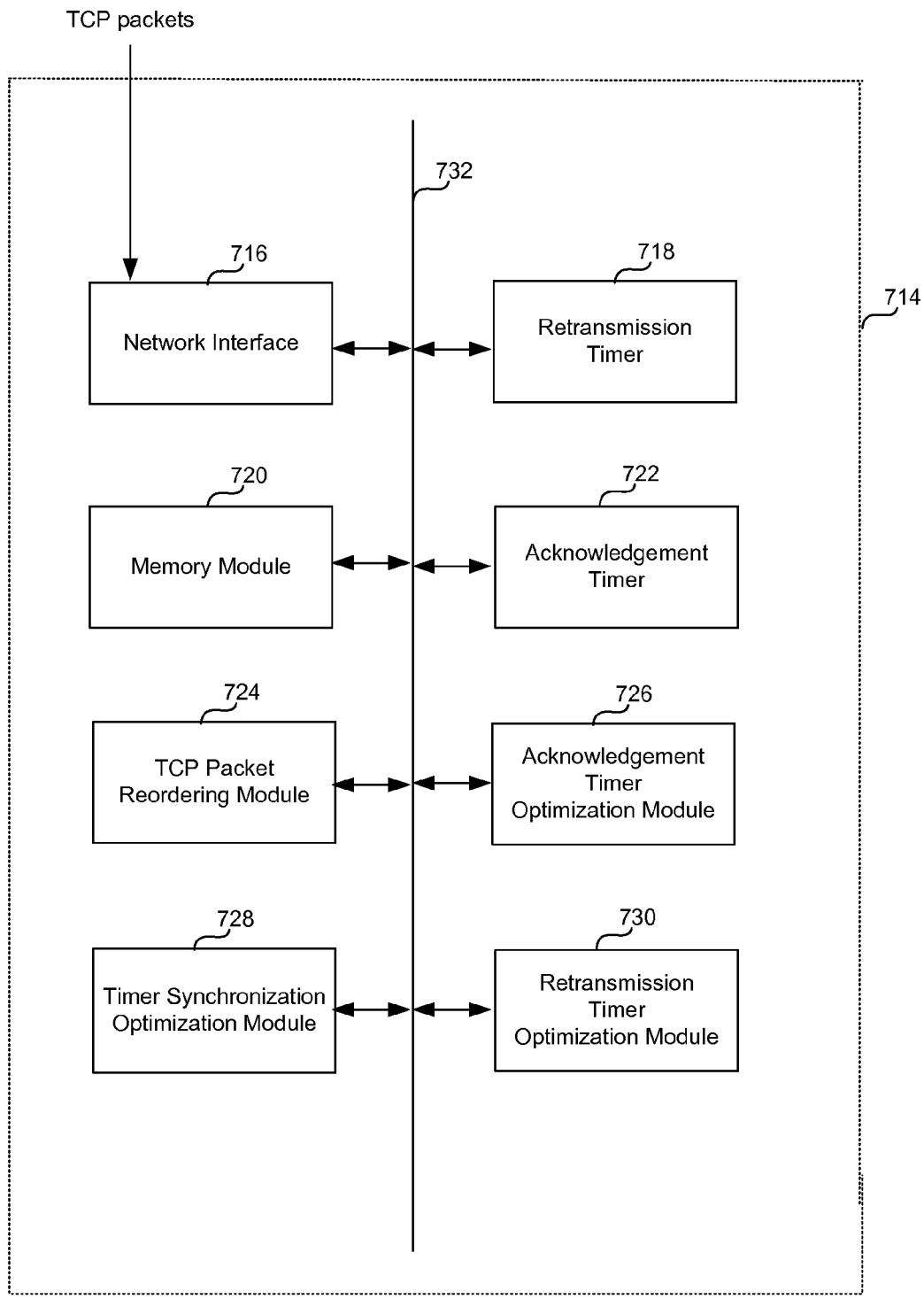
FIG. 7B is a functional block diagram illustrating the functional blocks in the central packet analysis system as described in FIG. 7A.

FIG. 7B is a functional block diagram illustrating the functional blocks in the central packet analysis system 714 of FIG. 7A, according to one embodiment of the present invention. The packet analysis system 714 includes a network interface 716, a memory module 720, a TCP packet reordering module 724, a retransmission timer 718, an acknowledgement timer 722, an acknowledgement timer optimization module 726, a retransmission timer optimization module 730, and a timer synchronization optimization module 728, all of which are coupled to and communicate with one another via a bus 732.

Referring to FIG. 7B, the network interface 716 receives TCP packets captured by the packet capturing devices Ca and Cb and passes the received packets to the TCP packet reordering module 724 for TCP packet reordering and analysis according to one embodiment of the present invention. The TCP packet reordering module 724 reorders the received packets as described below with reference to FIGS. 8a-8d, according to one embodiment of the present invention. The acknowledgement timer 722 is a timer used by the TCP packet reordering module 724 to indicate the maximum time that the TCP packet reordering module 724 will wait for a missing packet until the it makes a decision that the missing packet is indeed lost due to packet communication problems. The retransmission timer 718 is a timer used by the TCP packet reordering module 724 to indicate the maximum time that it will wait for the retransmission of a missing packet until it makes a decision that the missing packet is indeed lost. The memory module 720 is used to store the received packets for further analysis while the TCP packet reordering module 724 waits to determine if the missing packets are received later on prior to expiration of the retransmission timer 718 and the acknowledgement timer 722. The acknowledgement timer optimization module 726 optimizes the expiration time of the acknowledgment timer 722 according the method described below with reference to FIG. 9. The retransmission timer optimization module 730 optimizes the expiration time of the retransmission timer 722 according the method described below with reference to FIG. 10. The timer synchronization optimization module 728 synchronizes the two timers Ta, Tb coupled to the packet analysis system 714 according to the method described below with reference to FIG. 11.

TCP Packet Reordering and TCP Data Stream Reconstruction Method

Figure 8A:
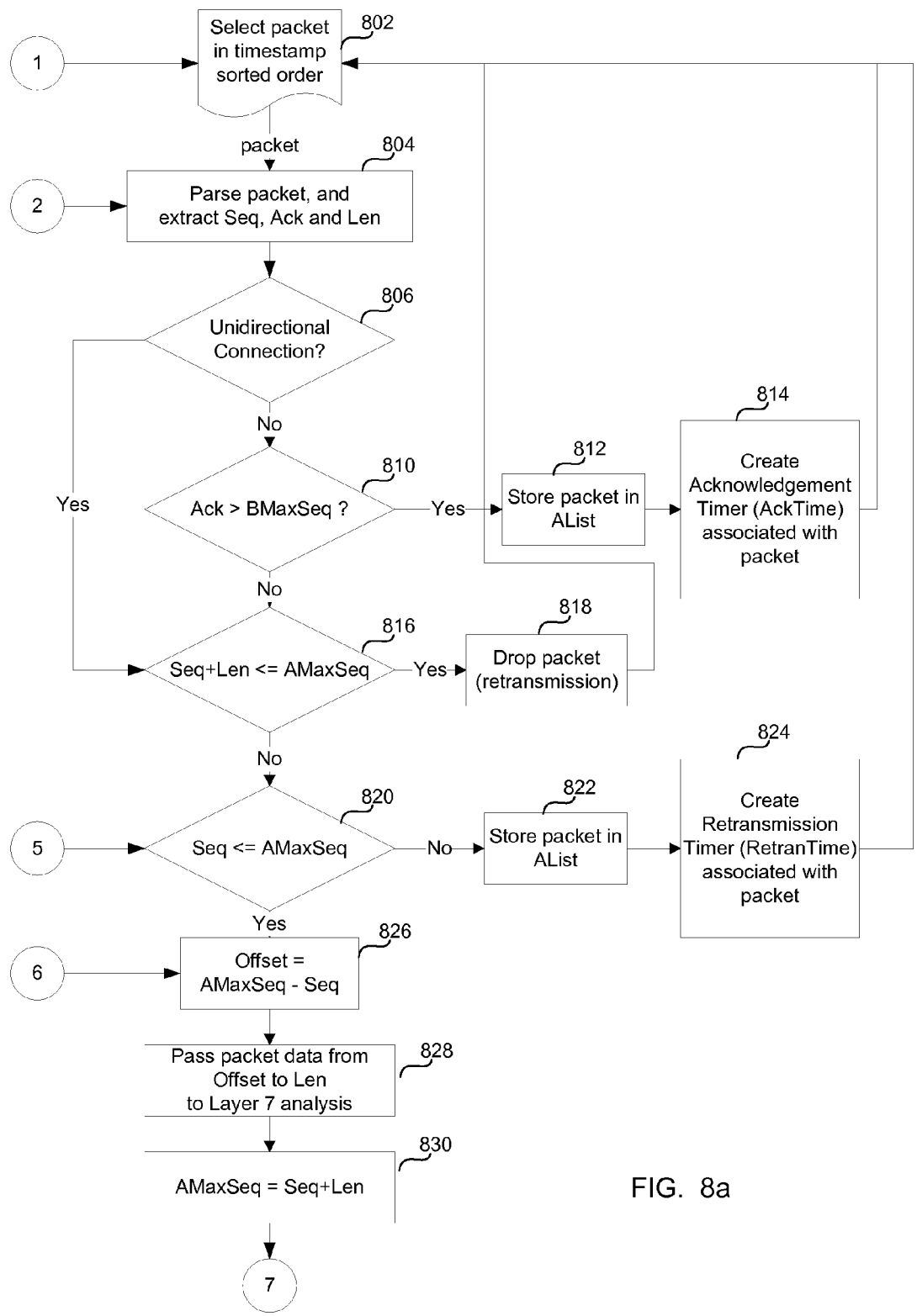
FIGS. 8a and 8b are flowcharts illustrating the TCP packet reordering and TCP packet reconstruction method according to one embodiment of the present invention.
Figure 8B:
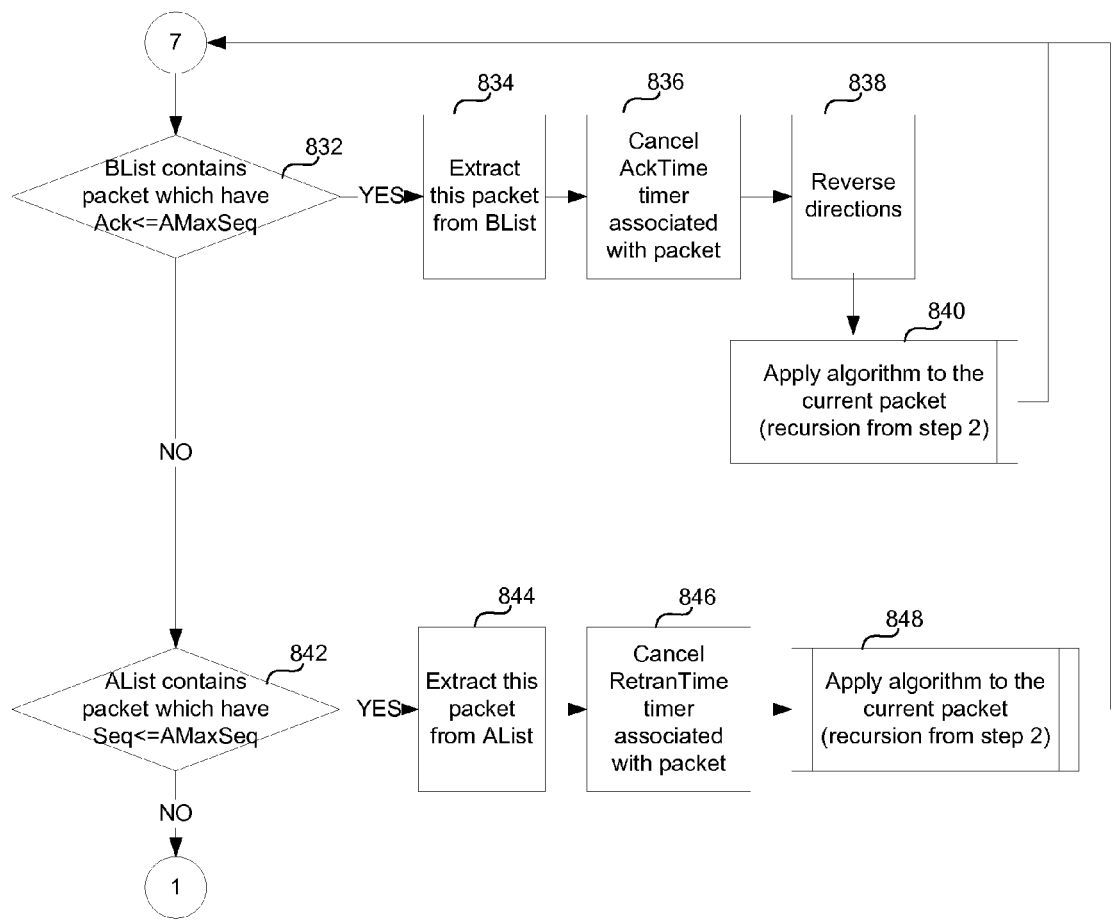

FIGS. 8a and 8b are flowcharts illustrating the TCP packet reordering and TCP packet reconstruction method according to one embodiment of the present invention. Referring to FIG. 8a, the method starts with selecting 802 the next packet from the timestamp-sorted combination of the {a1, a2, a3 . . . } and {b1, b2, b3 . . . } packet sets. For simplicity of explanation, it is assumed that this selected packet belongs to the sequence A from Peer A to Peer B. The captured packet is parsed 804, its sequential number Seq, data length Len and sequential number acknowledgement or acknowledgement number Ack are extracted 804 from the packet. It is first determined 806 whether the link between the two Peers A and B are unidirectional. If it is unidirectional, the method jumps to step 816. If it is not unidirectional, then it is determined 810 whether Ack>BMaxSeq (the latest seen continuous sequence of packets successfully communicated from the opposite direction B; this is maintained by the method) to determine the existence of packet communication problems resulting in a missing packet.

If Ack>BMaxSeq, this means that there exists one of the following packet communication problems to at least temporarily result in a missing packet: (i) Some of the opposite direction (B) packets were lost during the capturing process (capturing is a best-effort process, where some packets could still be lost), (ii) Due to the asymmetric nature of the packet traffic and the placement of the capturing devices Ca and Cb, the capturing devices are capturing only one half (one direction) of the communication, and (iii) Due to unequal delays in the capturing and delivery of packets, the packet analysis method does not see the packets in the same order as they had been presented to the network. In this case, the packet is stored 812 in a pending packets list (Alist) for the A direction, the method starts 814 the acknowledgement timer (AckTime) associated with this packet with its initial value set to D as defined in FIG. 7A, and the method returns to step 802 to select the next packet. The acknowledgement timer AckTime is an internal timer implemented by the TCP reconstruction method according to the present invention and indicates the maximum time that the method will wait for the missing packet, measured from the point of timer initialization in step 814, until the method makes a decision that the missing packet is indeed lost due to the one of the packet communication problems described above. As will be described in more detail below, the acknowledgement timer is canceled when the missing packet arrives. The initial value of the AckTime timer is set to D, according to one embodiment of the present invention. Thus, the method initially waits at least for the interval D to eliminate any packet reordering problem resulting from the capture-to-analysis delivery delay If Ack<=BMaxSeq, then it means that the packets are being processed in the correct order and the method moves on to step 816. In step 816, it is determined whether Seq+Len<=AMaxSeq (the latest seen continued sequence of packets successfully communicated from the current direction A, internally maintained by the method) to determine if the current packet is a retransmission of a previously processed packet. If Seq+Len<=AMaxSeq, then it means that the current packet is the retransmission of a previously processed packet, so the method drops 818 the current packet and returns to step 802 to select the next packet. If Seq+Len>AMaxSeq, the method proceeds to step 820.

In step 820, it is determined whether Seq<=AMaxSeq, to determine if the current packet was captured in a correct sequence. If Seq>AMaxSeq, then it means that some of the sequential packets in the A direction are lost. At this stage, there is not sufficient information to determine whether the missing packets in the A direction is a result of a natural TCP loss and the packet will be retransmitted by peer A or whether the missing packets in the A direction is a loss caused by the capturing process. In this case, the packet evaluated is stored 822 in the Alist, and the retransmission timer (RetranTime) associated with the stored packet is started 824. The retransmission timer RetranTime is an internal timer implemented by the TCP reconstruction method according to the present invention and indicates the maximum time that the method will wait for the retransmission of the missing packet, measured from the point of timer initialization in step 824. in the current direction A, until the method makes a decision that the missing packet is indeed lost in the capturing process. The initial value of the RetranTime timer is set to the maximum time allowed for TCP retransmission delay (usually 2 times the round trip communication time between Peers A and B plus 3 seconds) plus the maximum capture-to-analysis delivery delay D, according to one embodiment of the present invention.

If Seq<=AMaxSeq in step 820, then it means that the current packet was received in the correct order. The method determines 826 Offset (=AMaxSeq−Seq), extracts 828 and passes 828 the extracted packet payload data from byte Offset to Len to Layer 7 analysis. Then, AMaxSeq is advanced 830 by Len (AMaxSeq=Seq+Len).

Referring to FIG. 8*b*, the method continues to check pending packets stored in a Blist associated with the opposite direction B to determine 832 if the missing packet was previously received from the opposite direction B. If a packet whose Ack<=AMaxSeq exists 832 in the Blist, this packet is extracted 834 from the Blist, the acknowledgement timer AckTime associated with this extracted packet is cancelled 836, and the direction for analysis is reversed 838 to the B direction. Then, the entire method of FIGS. 8*a*-8*b* is applied 840 to this extracted packet recursively starting from the step 804.

If a packet whose Seq<=AMaxSeq does not exist 832 in the Blist, then the method determines 842 whether pending packets whose Seq<=AMaxSeq are stored in Alist for the current direction to determine whether missing packet was previously received in the direction A. If such packet exists, then this packet is extracted 844 from the Alist, the retransmission timer RetranTime associated with this extracted packet is cancelled 846, and the entire method of FIGS. 8*a*-8*b* is applied 848 to this extracted packet recursively starting from the step 804. If such packets does not exist 842, then the method returns to step 802 to select the next packet and apply the method to the new packet.

Figure 8C:
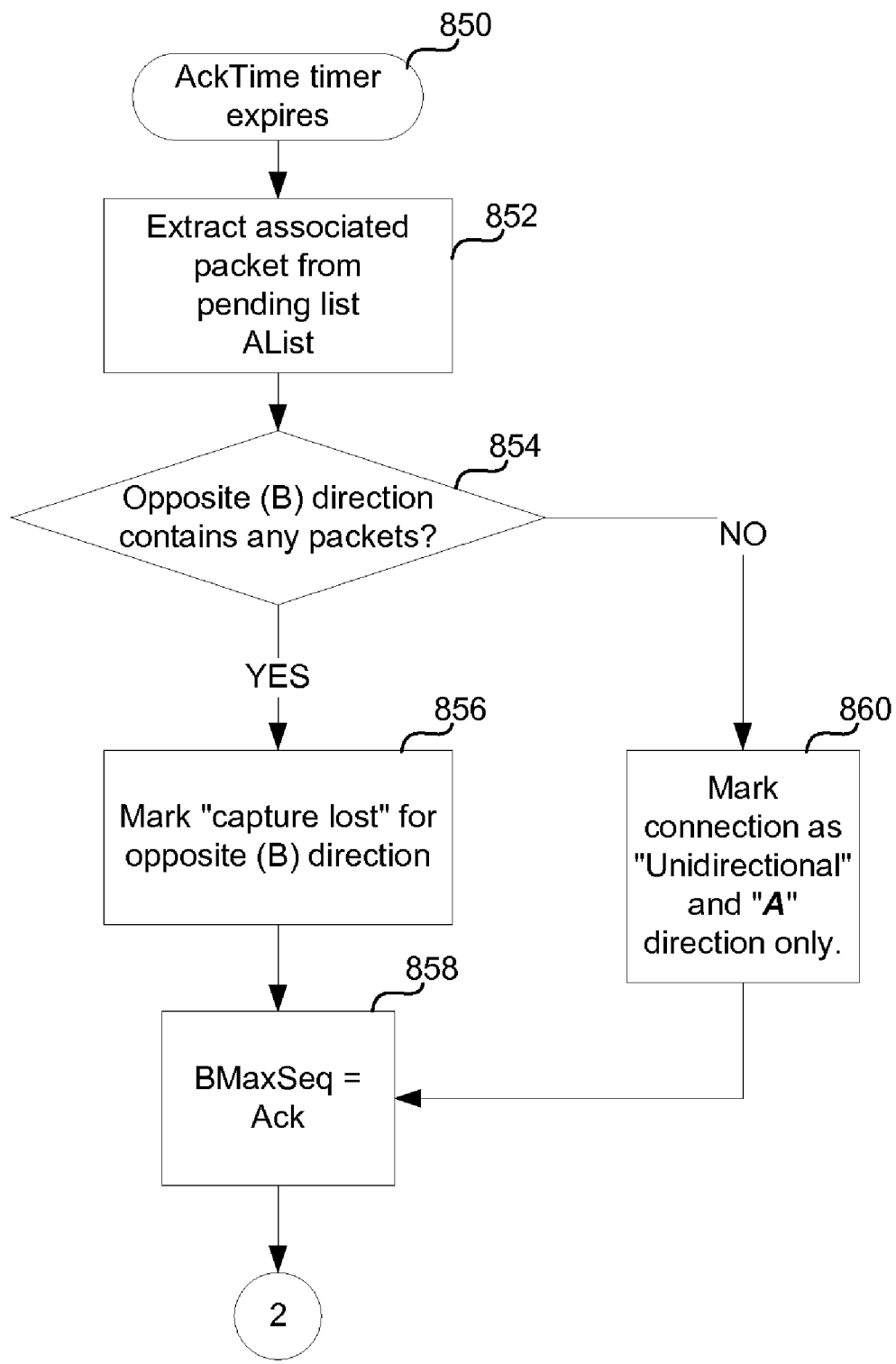
FIG. 8c is a flowchart illustrating the operation of the transaction reconstruction method when the acknowledgement timer (AckTime) expires, according to one embodiment of the present invention.
Figure 8D:
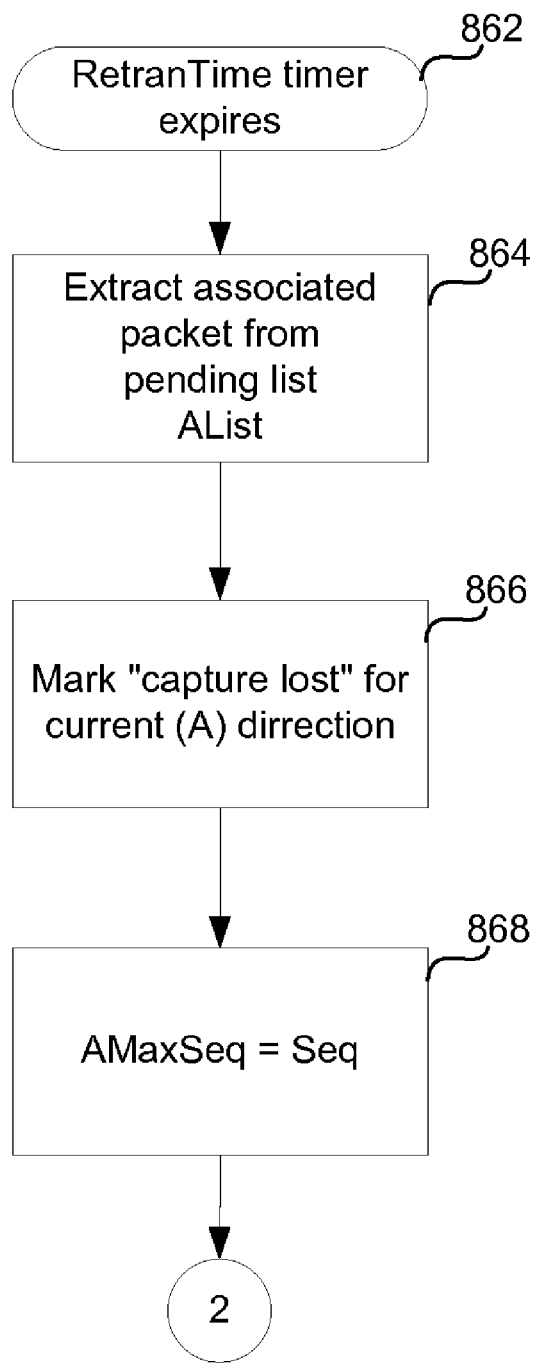
FIG. 8d is a flowchart illustrating the operation of the transaction reconstruction method when the retransmission timer (RetranTime) expires, according to one embodiment of the present invention.

If the acknowledgement timer AckTime or the retransmission timer RetranTime expires, it is concluded that the packet for which the method has been waiting was indeed lost in the capturing process, whose detailed operation is described in FIGS. 8*c* and 8*d*.

FIG. 8*c* is a flowchart illustrating the operation of the transaction reconstruction method when the AckTime timer expires, according to one embodiment of the present invention. Referring to FIG. 8*c*, if one or more of the AckTime timer expires 850, then it can be assumed that some packet(s) in the B direction were lost during the capturing process. Thus, the packet associated with the expired AckTime timer is extracted 852 from the pending packet list Alist, and it is determined 854 whether there were any packets captured in the B direction. If there were no packets captured in the B direction, then this means that the connection between Peers A and B is unidirectional in the A direction. Thus, the method marks 860 the connection as unidirectional in the A direction only. If there were packets captured in the B direction, then this means that the connection is bi-directional but there was a lost packet. Thus, the method marks 856 "capture lost" for the B direction, indicating that a packet was not captured in the B direction. Thereafter, BMaxSeq is advanced 858 such that BMaxSeq=Ack, Ack being that of the packet associated with the expired AckTime timer, and the method continues to step 804 to revert to normal operation.

FIG. 8*d* is a flowchart illustrating the operation of the transaction reconstruction method when the RetranTime timer expires, according to one embodiment of the present invention. Referring to FIG. 8*d*, if one or more of the RetranTime timer expires 860, then it can be assumed that some packet(s) in the current A direction were lost during the capturing process. Thus, the packet associated with the expired RetranTime timer is extracted 864 from the pending packet list Alist. The method marks 866 "capture lost" for the current A direction, indicating that a packet was not captured in the A direction. Thereafter, AMaxSeq is advanced 868 such that AMaxSeq=Seq, Seq being that of the packet associated with the expired RetranTime timer, and the method continues to step 804 to revert to normal operation.

Acknowledgement Timer optimization

In a distributed network environment, the delays of information delivery between the capturing devices and the packet analysis devices (D) could be significant (typically, in the order of tens of seconds). Using a relatively large initial value for the acknowledgement timer AckTime requires a significant amount of allocated memory to store the pending packets in the Alist. Processing of high-speed traffic is associated with the simultaneous analysis of a large number of simultaneous, independent TCP streams. Therefore, optimization of the acknowledgement timer AckTime would solve the problem of the prohibitive size and cost of memory required for the Alist.

The AckTime timer can be optimized based on the fact that packets belonging to a single direction are time-stamped and delivered to the packet analysis device in a strictly ordered fashion. This means that if the analysis device receives a peer B-originated packet with timestamp Tb, then any B-originated packet presented to the network prior to Tb−dT−d (time-stamped according to the master (Cb) timer) must have been processed or lost in capturing, where the interval d defines a maximum interval between packet capturing and time-stamping and the interval dT is the maximum time discrepancies between the timers Ta and Tb.

Figure 9:
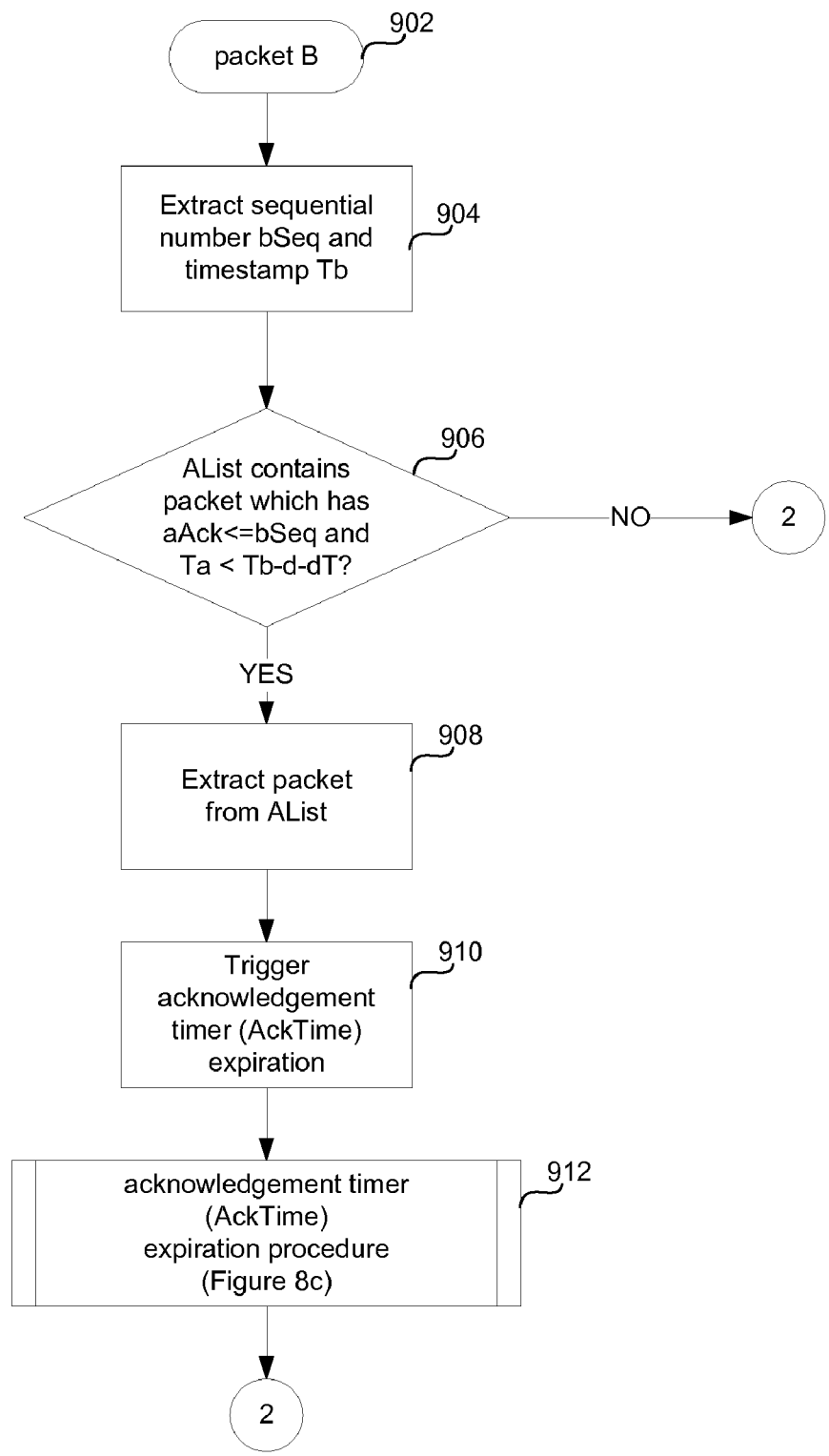
FIG. 9 is a flowchart illustrating the method of optimizing the acknowledgement timer (AckTime), according to one embodiment of the present invention.

FIG. 9 is a flowchart illustrating the method of optimizing the acknowledgement timer AckTime, according to one embodiment of the present invention. The method of FIG. 9 can be implemented as an additional functional block between steps 802 and 804 of FIG. 8, according to one embodiment of the present invention.

When a B-originated packet is received 902, its timestamp Tb and sequential number bSeq are extracted 904 from the packet. Then, it is determined 906 whether the pending list Alist of A-originated packets waiting for timer expiration includes a packet whose aAck<=bSeq and Ta<Tb−d−dT, where aAck is the acknowledgment number Ack of the A-originated packet. If such packet exists 906 in the Alist, then it is concluded that the packet corresponding to such A-originated packet was lost in the capturing process. In this case, the packet is extracted 908 from the Alist, the AckTime timer's expiration is triggered 910, and the method proceeds 912 to the AckTime expiration procedure described in FIG. 8c and then to step 804 of FIG. 8a to continue processing of the B-originated packet received. If such packet does not exist 906 in the Alist, the method proceeds directly to step 804 of FIG. 8a to continue processing of the B-originated packet received. It should be noted that the method of FIG. 9 should be applied to both the A and B-originated directions to fully optimize the AckTime timer.

Retransmission Timer Optimization

Similar to the AckTime timer, the initial value of the retransmission timer RetranTime could be significant, requiring allocation of a large (sometimes prohibitively large) amount of memory for the pending list Alist. The RetranTime timer can also be optimized using the method described below in FIG. 10.

Figure 10:
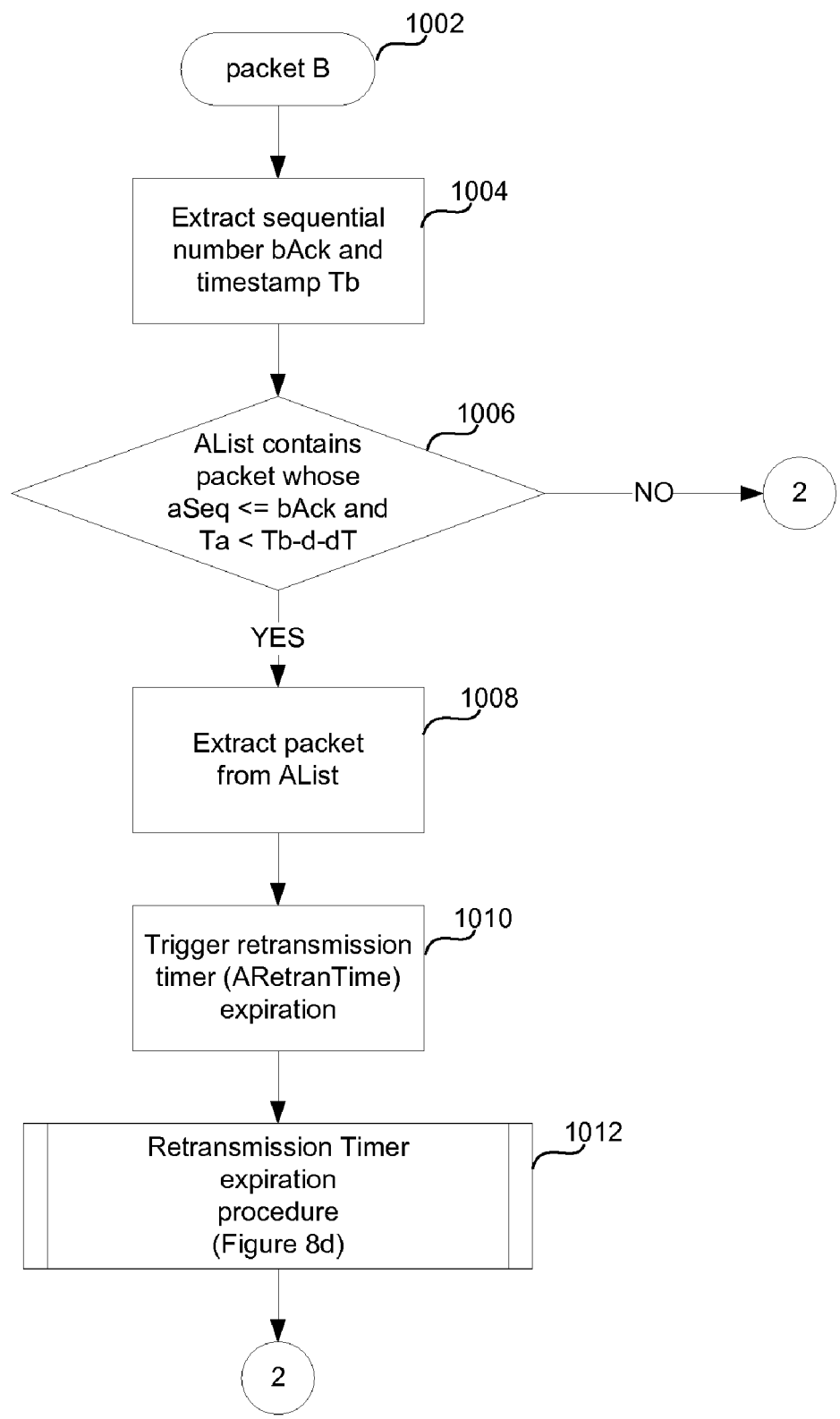
FIG. 10 is a flowchart illustrating the method of optimizing the retransmission timer (RetranTime) according to one embodiment of the present invention.

FIG. 10 is a flowchart illustrating the method of optimizing the retransmission timer RetranTime, according to one embodiment of the present invention. The method of FIG. 10 can be implemented as an additional functional block between steps 802 and 804 of the method described in FIGS. 8a-8b, according to one embodiment of the present invention.

When a B-originated packet is received 1002, its timestamp Tb and acknowledgement number bAck are extracted 1004 from the packet. Then, it is determined 1006 whether the pending list Alist of A-originated packets waiting for timer expiration includes a packet whose aSeq<=bAck and Ta<Tb−d−dT, where aSeq is the Seq of the A-originated packet. If such packet exists 1006 in the Alist, then it is concluded that the packet corresponding to such A-originated packet was lost in the capturing process. In this case, the packet is extracted from the Alist, the RetranTime timer's expiration associated with the A-originated packet is triggered 1010, and the method proceeds 1012 to the RetranTime timer expiration procedure described in FIG. 9d and then to step 804 of FIG. 8a to continue processing of the B-originated packet received. If such packet does not exist 1006 in the Alist, the method proceeds directly to step 804 of FIG. 8a to continue processing of the B-originated packet received. It should be noted that the method of FIG. 10 should be applied to both the A and B originated directions to fully optimize the RetranTime timer.

Timer Synchronization Optimization

The performance of the transaction reconstruction method of the present invention can be even more improved if the timers A and B are well-synchronized. The initial timestamp-based packet sorting (step 802 of FIG. 8a) and optimization of the AckTime and RetransTime timers (FIGS. 9 and 10) depend on the time discrepancy dT of the capturing devices Ca and Cb. Improvement of the estimation of dT would result in minimization of the memory sizes corresponding to the pending-packet lists Alist or Blist, and as a result in improvement of performance of the transaction reconstruction method of the present invention.

The present invention provides a method for estimating the discrepancies of the timers in the capturing devices Ca and Cb. The timer discrepancy estimation method assumes that a safe estimation of an unknown value ddT can be made. The value ddT is the actual value of the time discrepancies between the timers Ca and Cb, which can be significantly smaller then the predetermined safe interval of dT. If ddT can be determined, then ddT can be substituted for dT in the initial timestamp-based packet sorting (step 802 of FIG. 8a) and the optimization methods of the AckTime and RetransTime timers (FIGS. 9 and 10) described above. The timer discrepancy estimation method of the present invention will be explained below with reference to FIG. 11.

Figure 11:
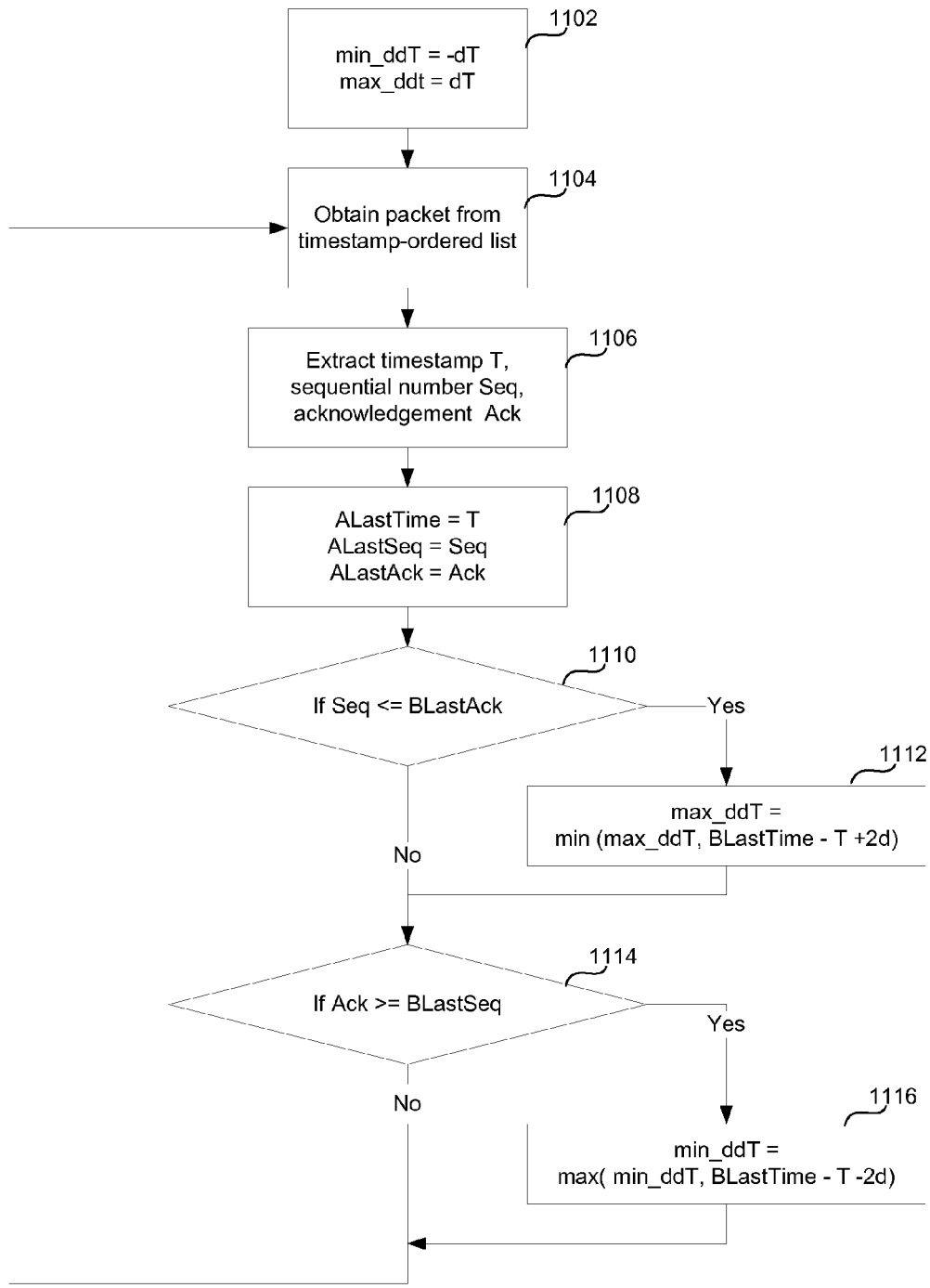
FIG. 11 is a flowchart illustrating the method of estimating the timer discrepancy according to one embodiment of the present invention.

FIG. 11 is a flowchart illustrating the timer discrepancy estimation method according to one embodiment of the present invention. The timer discrepancy estimation method of FIG. 11 is based upon the assumption that the capturing devices Ca and Cb captured two global events X and Y, event X happening prior to event Y. Capturing device Ca time-stamps events X and Y with values Tax and Tay, respectively, and capturing device Cb time-stamps events X and Y with values Tbx and Tby. By definition, the following is true:

$$Tbx = Tax + ddT \qquad \text{Equation (``Eq.'') (1)}$$

$$Tby = Tay + ddT \qquad \text{Eq. (2)}$$

$$Tax < Tay \qquad \text{Eq. (3)}$$

$$Tbx < Tby \qquad \text{Eq. (4)}$$

From the above equations (1)-(4), $$Tbx - Tay < ddT < Tby - Tax \qquad \text{Eq. (5)}$$

Since there is a delay d between packet capturing and time stamping, equation (5) can be refined as:

$$Tbx - Tay - 2d < ddT < Tby - Tax + 2d \qquad \text{Eq. (6)}$$

The timer discrepancy estimation method of the present invention assumes that two corresponding packets pa and pb are originated by network peers A and B, respectively. The sequential number of packet pa is aSeq and packet pb contains the acknowledgement number bAck. If aSeq<=bAck, then this means that packet pa was presented to the global network prior to packet pb and that their timestamps could be used in the estimation of ddT as above.

Referring back to FIG. 11, the method first initializes 1102 the minimum ddT value (min_ddT) and the maximum ddT value (max_ddT) as: min_ddT=−dT and max_ddT=dT. The next packet is selected 1104 from the timestamp-sorted combination of the {a1, a2, a3 . . . } and {b1, b2, b3 . . . } packet sets. It is assumed for simplicity that this selected packet belongs to the sequence of A packets {a1, a2, a3 . . . }. The captured packet is parsed 1106 and its timestamp T, sequential number Seq and sequential number acknowledgement Ack are extracted 1106.

ALastSeq, ALastAck, and ALastTime are variables used by the method of FIG. 11 to store the last seen numbers for Seq, Ack, and the timestamp T corresponding to the A-sequence of packets {a1, a2, a3 . . . }. BLastSeq, BLastAck, and BLastTime are variables used by the method of FIG. 11 to store the last seen numbers for Seq, Ack, and the timestamp T for the B-sequence of packets {b1, b2, b3 . . . }. The method stores 1108 the last seen numbers: ALastSeq=Seq; ALastAck=Ack; ALastTime=T.

Then, the method determines 1110 if Seq<=BlastAck. If Seq<=BlastAck, it can be concluded that the last B-originated packet was presented to the network after the current A-originated packet. As a result, the method sets 1112 max_ddT as:

max_ddT=min(max_ddT,BLastTime−T+2d).

The method also determines 1114 if Ack>=BLastSeq. If Ack>=BLastSeq then it can be concluded that the current packet was presented to the network after the last B-originated packet. As a result, the method sets 1116 min_ddT as:

min_ddT=max(min_ddT,BLastTime−T−2d).

If Ack<BLastSeq, the method returns to step 1104 to obtain the next packet from the timestamp-ordered list. If the interval (min_ddT, max_ddT) is small, the timer correction value c_ddT can be computed as:

c_ddT=(max_ddT+min_ddT)/2

Also, the new timer discrepancies value d_ddT can be computed as:

d_ddT=(max_ddT−min_ddT)/2.

The timer correction c_ddT could by applied to the Cb time. For example, every value of the timer Cb may be shifted by −c_ddT. The new discrepancy value d_ddT can be used as the replacement of dT. It should be noted that the timer discrepancy estimation method of FIG. 11 can be implemented as part of the TCP reconstruction method of FIGS. 8a and 8b.

Reordering of Non-TCP Packets:

The reordering of TCP packets according to the method of the present invention also improves reordering of non-TCP packets. Some portion (typically under 20%) of IP traffic is comprised of non-TCP packets, such as UDP, ICMP and other "pure" IP protocol packets. In general, non-TCP packets do not have an equivalent of the TCP sequential numbers. However, since non-TCP packets are intermixed within a stream with a prevailing number of TCP packets, using the timer synchronization method with TCP packets as described above with reference to FIG. 11 would improve the ordering of non-TCP packets as well.

Although the present invention has been described above with respect to several embodiments, various modifications can be made within the scope of the present invention. For example, the transaction reconstruction method of the present invention can be used with TCP packets transmitted on any type of link between any number of peer network applications, regardless of whether the link is a high-speed network or a low-speed network. The transaction reconstruction method of the present invention can be used with any network application involving transmission of TCP packets or any other reliable transport protocol packet. Also, the transaction reconstruction method of the present invention can be used with any network application involving transmission of any type of non-TCP packets. The transaction reconstruction method of the present invention can be embodied in the form of a computer program product recorded on a computer readable medium, and can also be implemented in the form of hardware such as the packet analysis system 400 shown in FIG. 4. Accordingly, the disclosure of the present invention is intended to be illustrative, but not limiting, of the scope of the invention, which is set forth in the following claims.

What is claimed is:

1. A method for estimating the actual discrepancy (ddT) between a first timer and a second timer used in a TCP (Transmission Control Protocol) packet reconstruction system for capturing and analyzing TCP packets, the TCP packets transmitted from a first device to a second device in a first direction on a first channel and from the second device to the first device in a second direction on a second channel, a first part of the TCP packets captured by a first packet capturing device on the first channel and time stamped by the first timer and a second part of the TCP packets captured by a second packet capturing device on the second channel and time stamped by the second timer, a minimum ddT (min_ddT) initialized as −dT and a maximum ddT (max_ddT) initialized as dT, dT being a maximum estimated time discrepancy between the first and second timers, the method comprising recursively performing:

selecting a TCP packet from the first part of the TCP packets; extracting a timestamp (T), a sequential number (Seq), and an acknowledgement number (Ack) from the selected TCP packet, the timestamp (T) being the timestamp imposed by the first timer on the selected packet, the sequential number (Seq) indicating a sequential number of a first data in the selected packet, and Ack indicating a sequential number of a last successfully received continuous data in the selected packet;

setting ALastTime as T, ALastSeq as Seq, and ALastAck as Ack, ALastTime indicating a timestamp of a last seen packet in the first direction, ALastSeq being a sequential number of the last seen packet in the first direction, and ALastAck being an acknowledgement number of the last seen packet in the first direction;

determining whether Seq is not more than BLastAck, BLastAck being an acknowledgement number of a last seen packet in the second direction;

responsive to determining that Seq is not more than BLastAck, modifying max_ddT as: max_ddT=min (max_ddT, BLastTime−T+2d), d being a maximum time between capturing of the packets by the first and second packet capturing devices and time stamping of the captured packets by the first and second timers;

determining whether Ack is not less than BLastSeq, BLastSeq being a sequential number of a last seen packet in the second direction; and responsive to determining that Ack is not less than BLastAck, modifying min_ddT as: min_ddT=max (min_ddT BLastTime−T−2d).

2. The method of claim 1, further comprising:

generating a modified discrepancy d_ddT between the first timer and the second timer by setting d_ddT as:

d_ddT=(max_ddT−min_ddT)/2.

3. The method of claim 1, further comprising:

generating a timer correction value c_ddT for the second timer by setting c_ddT as: c_ddT=(max_ddT+ min_ddT)/2.

4. A computer readable storage medium including instructions when executed by a processor adapted to perform a method for estimating the actual discrepancy ddT between a first timer and a second timer used in a TCP (Transmission Control Protocol) packet reconstruction system for capturing and analyzing TCP packets, the TCP packets transmitted from a first device to a second device in a first direction on a first channel and from the second device to the first device in a second direction on a second channel, a first part of the TCP packets captured by a first packet capturing device on the first channel and time stamped by the first timer and a second part of the TCP packets captured by a second packet capturing device on the second channel and time stamped by the second timer, a minimum ddT (min_ddT) initialized as −dT and a maximum ddT (max_ddT) initialized as dT, dT being a maximum estimated time discrepancy between the first and second timers, the method comprising recursively performing:

selecting a TCP packet from the first part of the TCP packets;

extracting a timestamp (T), a sequential number (Seq), and an acknowledgement number (Ack) from the selected TCP packet, the timestamp (T) being a timestamp imposed by the first timer on the selected packet, the sequential number (Seq) indicating a sequential number of a first data in the selected packet, and Ack indicating a sequential number of a last successfully received continuous data in the selected packet;

setting ALastTime as T, ALastSeq as Seq, and ALastAck as Ack, ALastTime being a timestamp of a last seen packet in the first direction, ALastSeq being a sequential number of the last seen packet in the first direction, and ALastAck being an acknowledgement number of the last seen packet in the first direction;

determining whether Seq is not more than BLastAck, BLastAck being an acknowledgement number of a last seen packet in the second direction;

responsive to determining that Seq is not more than BLastAck, modifying max_ddT as: max_ddT=min (max_ddT BLastTime-T+2d), d being a maximum time between capturing of the packets by the first and second packet capturing devices and time stamping of the captured packets by the first and second timers;

determining whether Ack is not less than BLastSeq, BLastSeq being a sequential number of a last seen packet in the second direction; and responsive to determining that Ack is not less than BLastAck, modifying min_ddT as: min_ddT=max (min_ddT BLastlime-T−2d).

5. The computer readable storage medium of claim 4, wherein the method further comprises: generating a modified discrepancy (d_ddT) between the first timer and the second timer by setting d_ddT as: d_ddT=(max_ddT−min_ddT)/2.

6. The computer readable storage medium of claim 4, wherein the method further comprises: generating a timer correction value (c_ddT) for the second timer by setting c_ddT as: c_ddT=(max_ddT+min_ddT)/2.

* * * * *

UNITED STATES PATENT AND TRADEMARK OFFICE
CERTIFICATE OF CORRECTION

PATENT NO. : 7,636,346 B2                                            Page 1 of 1
APPLICATION NO. : 12/022871
DATED : December 22, 2009
INVENTOR(S) : Stanislav Khirman It is certified that error appears in the above-identified patent and that said Letters Patent is hereby corrected as shown below:

Column 16, Line 48 Claim 1, add comma between "(min_ddT" and "BLastTime-T-2d)", so column 16, line 48 reads --(min_ddT, BLastTime-T-2d).--.

Column 18, Line 6 Claim 4, add comma between "(max_ddT" and "BLastTime-T+2d)" so column 18, line 6 reads --(max_ddT, BLastTime-T+2d), d being a maximum time--.

Signed and Sealed this

Twenty-third Day of February, 2010

David J. Kappos
*Director of the United States Patent and Trademark Office*